United States Patent [19]
Ando et al.

[11] 3,888,360
[45] June 10, 1975

[54] INDUSTRIAL ROBOT

[75] Inventors: Reijiro Ando, Funabashi; Shigeru Iwai, Chiba, both of Japan

[73] Assignee: Kabushiki Kaisha Daini Seikosha, Japan

[22] Filed: Apr. 8, 1974

[21] Appl. No.: 459,099

[30] Foreign Application Priority Data
Apr. 11, 1973 Japan............................ 48-42718

[52] U.S. Cl............................. 214/1 BB; 214/1 BC
[51] Int. Cl............................................ B25j 11/00
[58] Field of Search.... 214/1 BB, 1 BC, 1 BT, 1 BH

[56] References Cited
UNITED STATES PATENTS
| | | | |
|---|---|---|---|
| 3,575,301 | 4/1971 | Panissidi............................ | 214/1 BC |
| 3,834,555 | 9/1974 | Bennington....................... | 214/1 BT |

Primary Examiner—Robert J. Spar
Assistant Examiner—George F. Abraham
Attorney, Agent, or Firm—Robert E. Burns; Emmanuel J. Lobato; Bruce L. Adams

[57] ABSTRACT

An industrial robot capable of carrying out packing operations of articles. The robot is pneumatically operated and has a base on a bed movable upwardly and downwardly. The base is capable of translating relative to the bed. A lift in the base carries an transfer arm that it lifts and lowers and rotates or swings. The transfer arm is reciprocable and carries a manipulator rotatable about a horizontal axis. The manipulator has grippers operable to carry out gripping of articles. The various operations are carried out pneumatically. The bed is raised and lowered by a motor-driven screw and the base is translated by a linear-pulse motor.

4 Claims, 9 Drawing Figures

PATENTED JUN 10 1975 3,888,360

SHEET 1

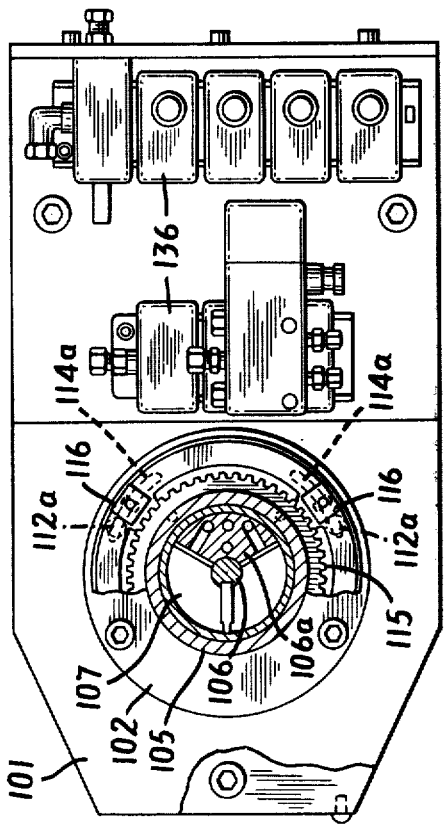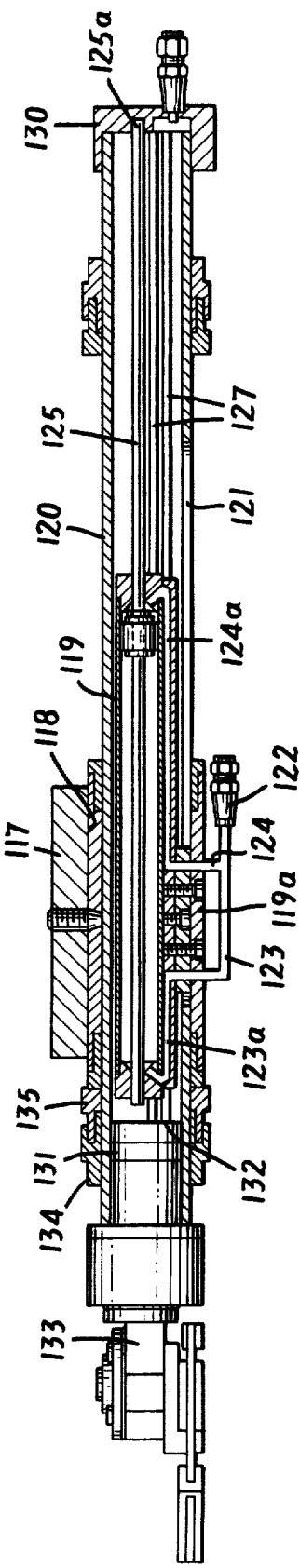

3,888,360

INDUSTRIAL ROBOT

BACKGROUND OF THE INVENTION

The present invention relates to an industrial robot, and more particularly to an industrial robot capable of effecting swinging, vertical horizontal and gripping movements, which is adapted to carry out various functions by mounting such an industrial robot on a control base which effects three-dimensional operations such as sweeping, vertical and transfer movements.

The conventional industrial robots have been limited to a certain operation in range although they carry out three-dimensional operations such as swinging, vertical and horizontal movements. Therefore, for example, the operation of carrying products from one to another position is disadvantageous in that the products are usually carried only in a certain direction. In this case, the use of a conveyor, in the positions at which the products are supplied and carried, removes such a disadvantage or drawback. In case the object is putting the products in a case, however, its operation is impossible because the position at which the products are put is different.

For an operation of putting the products in a case, there is a utilized or employed a large-sized industrial robot limited to a hydraulic drive, such as "Unimate" or "Versatran" (by tradename). However, industrial robots of the above type become very expensive and also are large-sized in the movable base type because of the restriction of the hydraulically powered drive. In addition, it is impossible for the above-mentioned robots to pack in a case small parts and to perform a transfer operation.

SUMMARY OF THE INVENTION

A principal object of the invention is to provide an industrial robot that can carry out movements so that it can effect packing of articles in a case.

Another object is to provide an industrial robot that carries out most of its operations pneumatically which restrictions as to movements.

The robot according to the invention is programmable. It has a bed lifted and raised vertically on which is a base that translates in opposite directions on the bed. A lift raises and lowers a transfer arm relative to the base. The transfer arm can swing relative to a vertical axis and reciprocate relative thereto. A manipulator on the arm rotates relative to a horizontal axes and has grippers that can grasp articles.

The robot is programmed by cards that have perforations embodying the instructions. The perforations are read by detectors and commands on instructions are imparted to electromagnetic valves that control the supply of air under pressure to the robot for effecting various operations. The supply of air can also be controlled normally.

BRIEF DESCRIPTION OF THE DRAWING

FIGS. 4 and 5 are sectional view taken along the section line 4—4 and the section line 5—5 of FIG. 3.

FIG. 7 is a sectional view of a part of the robot in FIG. 1.

DESCRIPTION OF THE PREFERRED EMBODIMENTS

Figure 1:
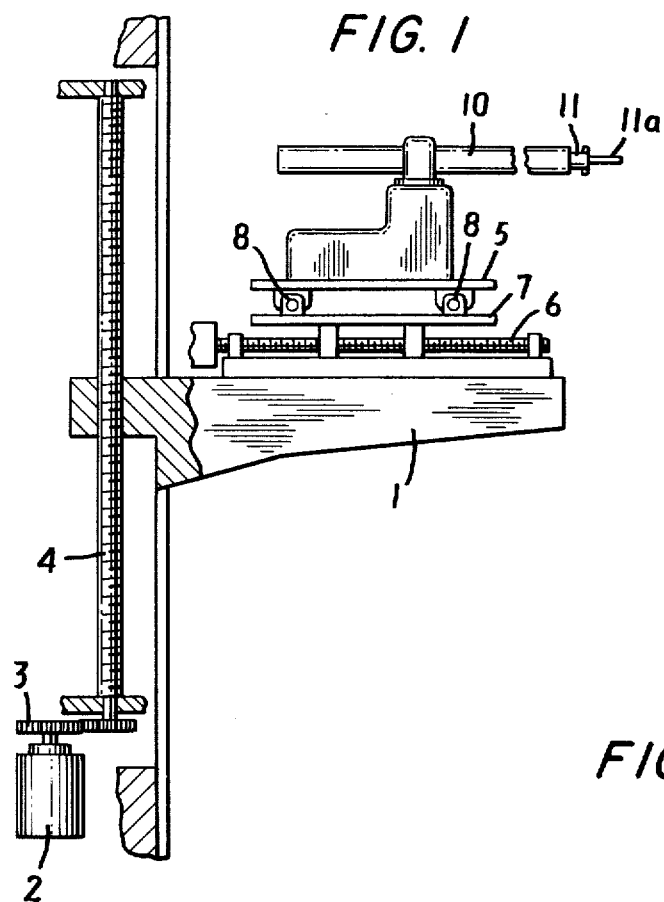
FIG. 1 is a side elevation view of an embodiment of the robot according to the present invention.
Figure 2:
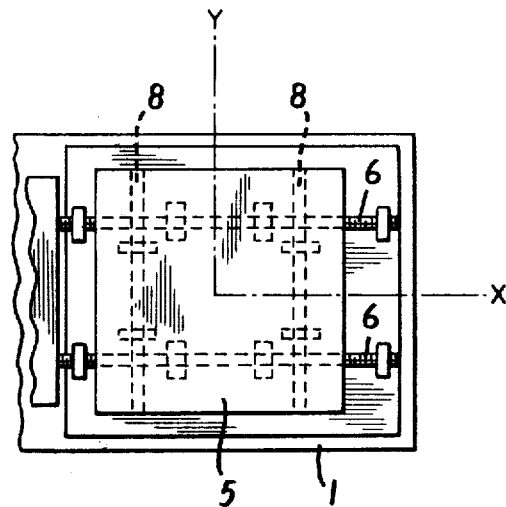
FIG. 2 is a plan view of a base according to the invention.
Figure 6:
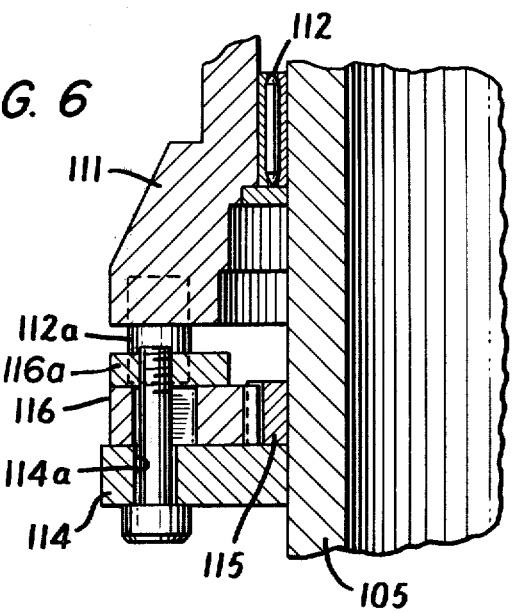
FIG. 6 is an fragmentary enlarged view in section of a swinging member.
Figure 3:
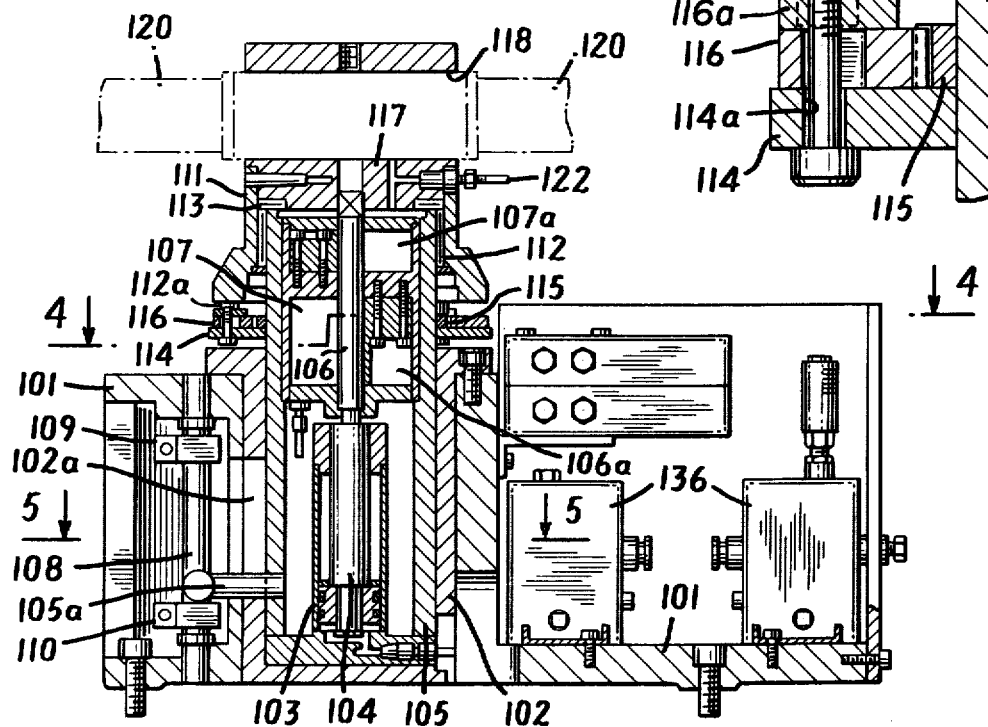
FIG. 3 is a longitudinal sectional view showing the body of the robot in FIG. 1.

Referring to the accompanying drawings, in FIG. 1 there is shown a side view of an industrial robot according to the invention.

A bed 1 is adjusted in vertical positioning thereof by means of a pulse motor 2 connected to a reduction gear 3 for rotatably driving a screw 4 for effecting two-way movement. The bed 1 is provided with a base or pedestal 5, which reciprocates along the X-Y axes. Namely the rotating of the screw 4 by the pulse motor 2 controlled numerically permits the base 5 to perform a reciprocating motion. The bed 1 is provided in the X-axis thereof with screws 6. These screws 6 is provided with a slidable base 7 which are free to slide on the bed 1 along the axial direction of the screws 6. In addition, the slidable base 7 is provided with rotatable screws 8 disposed to cross with the X-axis and also to mesh or engage with one portion of the base 5, which is able to slide on the base 7 along the axial direction of the screws 8. Accordingly the rotating of the screws 6 and 8 permits the base 5 to effect two-direction movements in X-Y axial directions. Moreover only a linear motor permits the base 5 to effect X-Y axial movements without using a screw rotated by a pulse motor. In a linear motor there is selectively set the moving direction by a numerically-controlled device because of no limitation to the X or Y axis direction.

The industrial robot according to the invention is able to effect gripping, rotating and swinging movements while mounted on the base 5. The above operations are effected along with the operations of the bed 1 and the base 5 with the aid of a numerically-controlled device. A transfer arm 10 secured in the industrial robot has a dimension as follows; for example, about 150mm in the horizontal stroke and 50 mm in the vertical stroke and has a 220° in a swinging range. The transfer arm 10 is provided at the tip thereof with a manipulator 11 at the tip portion of which a claw 11a is attached to effect gripping, rotating and swinging movements.

FIGS. 3 to 7 show the principal construction of the industrial robot according to the invention. A frame 101 is fixedly mounted on a suitable working table. A guide barrel Pipe 102 is provided integrally with an air cylinder 103 in its axial center and mounted vertically on the frame 101, thus guiding it in the vertical direction along its inner surface. The guide pipe 102 is provided with a cylindrical 105 which can effect vertical movement. Vertical movement of a piston rod 104 accommodated in the air cylinder permits the cylindrical lift 105 to perform vertical movement. The cylindrical lift 105 is provided at the center portion thereof with a rotary shaft 106, which is coaxial with the piston rod 104 and rotatable through a rotary-actuator 107 for driving the shaft 106, thereby effecting vertical movement of the lift 105 with the aid of the vertical movement of the rod 104 and through the shaft 106. The guide pipe 102 has an aperture 102a in a side extending axially thereof. The cylindrical lift 105 is formed at its one side with two arms 105a and 105b, which extend outwardly from the aperture 102a and are movably supported on a shaft 108 secured to the frame 101. This adjusts the vertical movement range of the cylindrical lift 105. The shaft 108 is provided with adjustable stops 109 and 110 movable thereon to locate the arms. The outer surface of the cylindrical lift 105 is provided at the tip portion with a rotary sleeve rotatable on bearings 112 and 113. The sleeve 111 is secured to the rotary shaft 106 along with a hereinafter described sweep member 117. Accordingly, the sweep member 117 and sleeve 111 are rotated by rotating of the shaft 106 with the aid of the rotary actuator 107. The sweep range of the sweep member 117 is adjusted by a stop pin 112a provided at the lower end of the sleeve 111, see FIGS. 4 and 6.

A flange 114 extending integrally outwardly from the cylindrical lift 105 and a gear 115 smaller than the flange 114 are attached to or located at the lower end of the sleeve 111. The above stop pin 112a is arranged to abut against sweep end stops 116a clamped or bolted on a toothed ring 116 which is in engagement with the gear 115. The flange 114 on the cylindrical lift 115 has elongated apertures 114a through which bolts and a nut thereon, forming the stops 116a, extend for clamping the ring 116 in position on the flange 114. The stop pins 112a bear on the angularly spaced sweep end stops 116a. The ring 116 may be released from its clamped condition and adjusted angularly relative to the inner ring 115. The outer ring 116 has inner toothed sectors that are disposed meshing with the teeth of the inner gear 115. Thus the angular positions of the end sweep stops is adjustable within the range permitted by the elongated slots 114a.

In order to control the rotating force of the shaft 106, the tip portion thereof is provided with a hydraulically powered buffering device 107a which is composed of an oil chamber into which the shaft 106 is rotatably inserted with a precise fit. The oil chamber is divided into two parts by a vane 106a provided with an oil hole connecting with the rotating shaft 106 so that an oil in the oil chamber flows by means of the rotating force of the shaft 106 from one chamber to another, thereby keeping the balance of the rotating torque for the shaft 106 with the aid of the oil hole diameter. The above-mentioned swing member 117 has a thorough-bore 118 crossing with the shaft 106.

A transfer arm 120 provided with an air cylinder 119 is connected to the through-bore 118 in position to slide therein. The transfer arm 120 is provided with an elongated slit 121 through which a mounting member 119a attached at lower end portion is fixedly secured to the swing member 117. The air cylinder 119 is provided with conduits 123a and 124a connecting with conduits 123 and 124 which communicate with an air valve 122 through which compressed air is supplied to the air cylinder 119. The end portion 125a of a piston rod 125 accommodated in the air cylinder 119 extends outwardly therefrom and is fixed to a head cap 130, which is adapted to close one end portion of the transfer arm 120. A plurality of air tubes 127 are arranged in the bore of the transfer arm 120 in order to supply compressed air to control the motion of a manipulator which will now be described.

End portions of the air tubes 127 communicate with a compressed air supplying connection fixed in the head cap 130 similar to the piston rod 125. Further, the other portion is interconnected to a through-passage 132 defined in a member 131 through which compressed air in communication with various air supplying holes provided at the member for operating the manipulator 133. The end portion of the transfer arm 120 is integrally provided with a guide member 134 in parallel therewith, which is guided for uniform reciprocation of the transfer arm 120 through a guide member 135 provided on the swing member 117.

Figure 8:
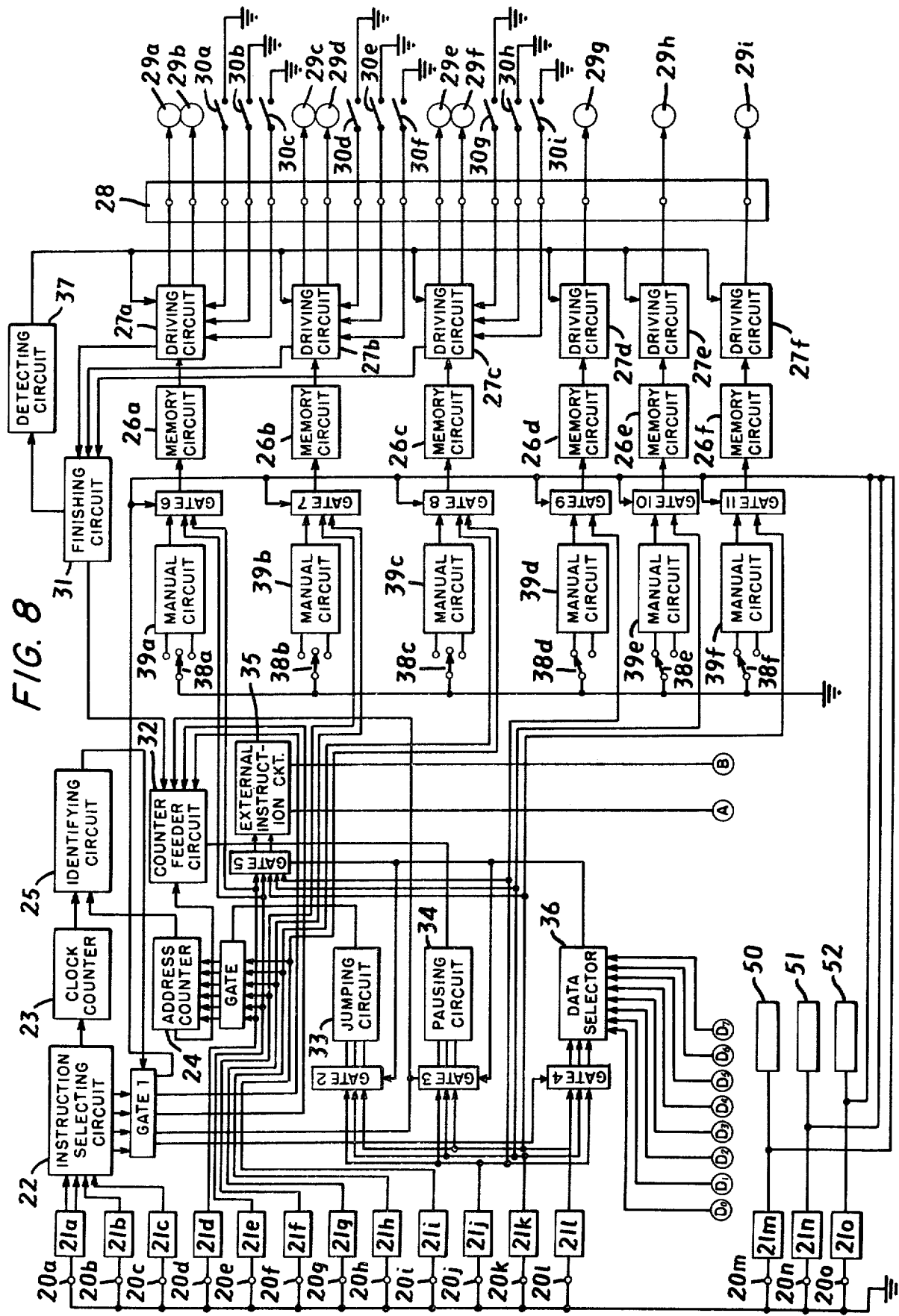
FIG. 8 is a block diagram of control circuitry for the robot.

As shown in FIG. 8, control circuits for operating the bed 1, base 5 and manipulator 131 are provided. Elements 20a to 20° are each an optical detector such as a photo-transistor. The detectors detect a ray through an aperture of preprogrammed cards. A plurality of wave shaping circuits 21a to 21° are connected each to individual ones of the optical detectors 20a to 20°. The outputs from the three wave shaping circuits 20a, 20b and 20c are fed to an instruction selecting circuit 22 which applies signals in the form of clock signals to a clock counter 23. Further, the instruction selecting circuit 22 transmits to a gate 1 the instructions as follows: an operational instruction; an external instruction for transmitting indication signals to the external terminals; a jumping instruction stopping the motion orderly practiced until the preceding address and jumping to the other assigned address without practicing the following addresses; a pausing instruction stopping at the address and preventing the instruction from advancing to the next address; and a flag-sense instruction examining whether the external conditions are conformed or not. The clock counter 23 counts cyclicly from the first address to the last address in response to clock signals. An address counter 24 has an assigned address to be carried out. When the address of the address counter 24 is identified with the counter member of the clock counter 23, a pulse is generated from an identifying circuit 25, thus opening the gate 1. When the gate 1' is opened, predetermined instruction signals go out of the gate to the assigned address. The operational instruction signals generated from the gate 1 opens the gates 6' to 11', and is memorized at the memory circuits 26a to 26f corresponding thereto. The gates 6' to 8' control the horizontal, vertical and swinging movements of the transfer arm, respectively. The gates 9' to 11' control the gripping, rotating and swinging movements of the manipulator, respectively. Driving circuits 27a to 27f correspond to the above-mentioned memory circuits, respectively, and the output signal is applied to a connector 28.

The mechanical unit is provided with electromagnetic valves 29a to 29i controlling compressed air for operating the transfer arm and the manipulator, respectively, each of the valves 29a to 29i is connected to the driving circuits 27a to 27f corresponding thereto through the connector 28 as shown in the drawing. Electromagnetic valves 29a and 29b, 29c, and 29d, 29e and 29f control the horizontal, vertical and swinging movements of the transfer arm, respectively, while electromagnetic valves 29g, 29h and 29i control the gripping, rotating and swinging movements of the manipulator, respectively.

Switches 30a to 39c are attached to the horizontal axis of the arm, that is, a front end-stop switch, an intermediate switch, a back end-stop switch, respectively.

Similarly switches 30d, 30e and 30f is an upper end-stop switch, an intermediate switch and a lower end-stop switch, respectively, attached to the vertical axis of the arm. Switches 30g, 30h and 30i are a right end-stop switch, an intermediate switch and a left end-stop switch, respectively, attached to the swing axis of the arm. All of these switches are connected to the driving circuits of each axis through the connector 28. When all of the operations have finished, each of the stop switches operates for application of the finishing signals of the operation to a operation finishing signal circuit 31 through the driving circuit.

When the signal indicating the finish of all the directional operations of the arm is transmitted to the operation finishing signal circuit 31, the pulse is generated and a counterfeeding circuit 32 is supplied with the pulse. Accordingly, the address counter 24 is advanced by one address by means of the counterfeeding circuit 32. The flag-sense signal generated by the gate 1 opens the gate 4, and a data selector is supplied with signal generated by the Schmidt circuit 21g, 21h and 21e. The signals generated by the above-mentioned circuits 21g, 21h and 21e determine which signals they should select from the external signals Do to D7. The date selector 36 discriminates whether the predetermined external signals are conformed or not, and transmits signals to each of the gates of a jumping circuit 36, external indication circuit 35 and pausing circuit 34, namely gates 2', 5' and 3'. Next the jumping instruction given by the gate 1 opens the gate 2', so that the signals of Schmidt circuit 21g, 21k and 21l enter the jumping circuit 33. It is to noted that the signals entering the Schmidt circuit assign the conditions in carrying out the jumping motion. In a word, the execution of the jumping instruction is divided into 1. the carrying out irrespective of any conditions
2. the carrying out when conditions are conformed
3. the carrying out when conditions are not conformed The jumping circuit 33 opens the gate 4' when the conditions are discriminated as assigned, so that the signals of the Schmidt circuits 21d to 21i enter the address counter 24 since it is discriminated by the flag-sense instructions whether the external conditions are conformed or not. The above-mentioned signals 21d to 21i assign the address to be jumped. After the jumping motion has taken place, the assigned address is carried out next. When the jumping motion is not carried out because the conditions are not conformed as assigned, the address counter 24 is advanced by one address by the counterfeeding circuit 32. The pausing signal generated by the gate 1 opens the gate 3, and the signals of the Schmidt circuits 21j to 21l enter the pausing circuit 34. The pausing circuit 34 as well as the above-mentioned jumping circuit generates the pulse in accordance with the assigned conditions given by the Schmidt circuits 21j to 21l. The pausing circuit 34, when the pausing instruction is not carried out because of no discriminated condition as assigned, advances by one address by the counterfeeding circuit 32. The external signals generated by the gate open the gate 5', and the signals of the Schmidt circuits 21d and 21e, and 21j to 21l enter an external indication circuit 35, which assigns to which terminal A or B it should transmit the signals from the Schmidt circuits 21d and 21e.

The signals of the Schmidt circuits 21j to 21l, like the above-mentioned jumping instruction, are adapted to assign the conditions. Signals can be taken from the terminals A and B to control the other mechanical units. When all the operation finishing signals corresponding to each axis do not come with all the lapse of certain hours after all the operations have finished, a detecting circuit 37 cuts the power supply of the driving circuit 27a so that they can not move, and thus damage to the machine is prevented. This device is provided with hand-operated switches. The hand-operated switches 38a, 38b and 38c control the horizontal, vertical and swinging movements of the transfer arm, while hand-operated switches 38d, 38e and 38f control the gripping, rotating and swinging movements of the manipulator, respectively. These switches transmit signals to the gates 6' to 11' through hand-operated circuits 39a to 39f, respectively, corresponding to the switches, and thus the hand-operation can be realized.

Figure 9:
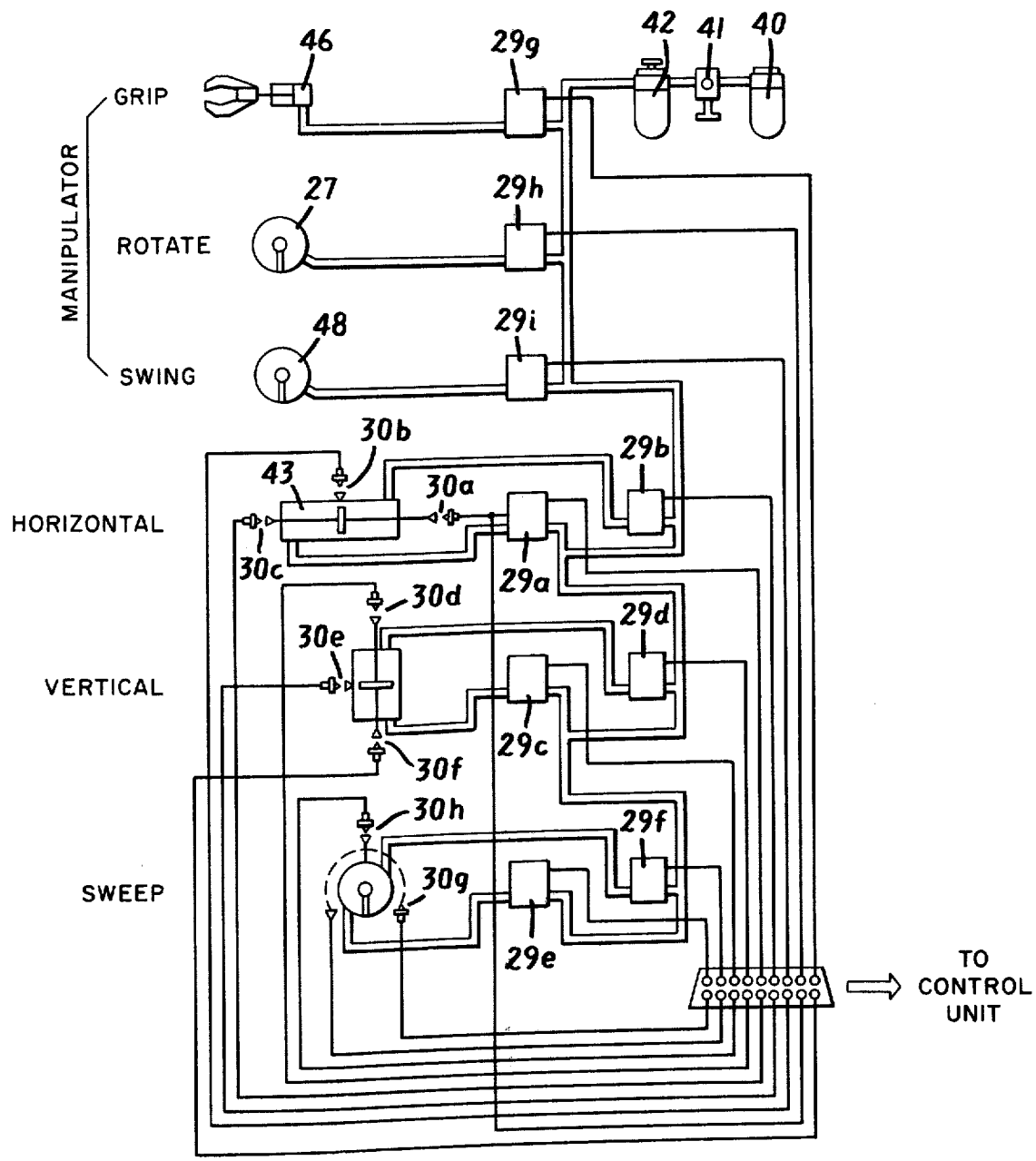
FIG. 9 is a block diagram of manipulator controls of the robot in FIG. 1.

FIG. 9 is a block-diagram showing the system of the mechanical unit. Each electromagnetic valve and switch is connected to the control unit through the connector 28. Compressed air passing through the pipe arrangement in the factory is adjusted the pressure of 4 kg/cm$^2$ by a regulator 41 through a filter 40. Moreover, the air of certain pressure puts pressure to each valve through an oiler 42. The opening of the electromagnetic valve 29a causes compressed air to enter an air cylinder 43 from the rear, and the arm moves forward to stop there. Then the signals showing the finish of the operations are generated due to the actuation of the front end-stop switch 30a. On the other hand, the opening of the electromagnetic valve 29b causes compressed air to enter the air cylinder 43 from the front, and the arm moves backward and stops there. Next the opening of the electromagnetic valve 29a due to the actuation of the intermediate switch 30b causes compressed air to enter the air cylinder from the rear, and the air cylinder moves forward to strike the intermediate switch 30b, while the opening of the electromagnetic valve 29b causes compressed air to enter the air cylinder from the front. As a result the cylinder stops at the place where the intermediate switch is provided because the piston is pressed from both sides. The opening of the electromagnetic valve 29g puts pressure on an air cylinder for effecting the gripping movement of the manipulator 11, and the operation of the gripping hand 11a is effected. When the electromagnetic valve 29g is closed, the gripping hand 11a is released to stop the gripping movement. In the same manner, the manipulator 11 effects rotation by the pressure applied to the air cylinder 47, and swings by the pressure applied to the air cylinder 48, the manipulator 11 being restored to the original state by the closing of the electromagnetical valve. Next, the signals of the Schmidt circuits 21m, 21n and 21o for detecting the signals of the optical elements 20m, 20n and 20o enter each driving circuits 50, 51 and 52 to the input of which the gates 6 to 11 are connected so as to move along with the actuation of the manipulator.

As mentioned above, various effects as mentioned hereinafter can be realized according to the present invention. 1. The following various movements can be carried out in combination selectively: the vertical movement of the bed 1; the swinging and reciprocal movement of the base; the gripping, rotating and sweeping movement of the manipulator 11. 2. The degree of freedom for the operation increases by adding the operation of the manipulator 11 in addition to the operation of the base 5, because of the mounting on the numerically controlled base 5 said manipulator 11. This makes various operations possible such as packing. 3. It is easy to operate compared with a hydraulically powered one because the manipulator utilizes compressed air as power source. Moreover it can be installed in any place and in a short time with the provisions of the power supply of AC 100 V and a pipe arrangement through which compressed air is supplied.

It is to be noted that the operation of the manipulator and the arm may be effected the driving movement by means of electromagnetical method in addition to the above-mentioned pneumatically operated one.

What we claim and desire to secure by letters patent:

1. A programmable robot comprising, a bed means for moving the bed upwardly and downwardly, a base on said bed movable in opposite directions along two axes, a loading unit having a pneumatically operated lift member on said base operable upwardly and downwardly, a sweeping member on an upper end portion of said lift member mounted for rotation thereon, a transfer arm on said sweeping member having reciprocable means reciprocable horizontally, and a manipulator on said transfer arm reciprocable means having grippers for gripping articles, means rotatably mounting the manipulator on said transfer arm, and control means to effect three dimensional movements of said manipulator comprising means for controlling raising and lowering of the bed, and the lift individually and simultaneously, means in said control means to rotate said sweeping member, means in said control means to reciprocate said transfer arm, and means in said control means to rotate said manipulator relative to said arm, and means in said control means for controlling operating of said grippers.

2. A programmable robot according to claim 1, further including a linear-pulse motor for driving said bed, a screw rotatably driven by said motor for lifting and lowering said bed.

3. A programmable robot according to claim 2, including two sets of driven screws disposed supported on said bed normal to each other for translating said base on said bed.

4. A programmable robot according to claim 1, in which said transfer arm is mounted transversely of said lift and extending therefrom, and said reciprocable means comprising pneumatically operated means reciprocable in opposite directions relative to said lift.

* * * * *